(12) United States Patent
Liang et al.

(10) Patent No.: US 9,588,513 B2
(45) Date of Patent: Mar. 7, 2017

(54) REMOTE MONITORING SYSTEM FOR DISTANT LOCATION ROBOT

(71) Applicant: FANUC CORPORATION, Minamitsuru-gun, Yamanashi (JP)

(72) Inventors: Yanxue Liang, Yamanashi (JP); Yoshiharu Nagatsuka, Yamanashi (JP)

(*) Notice: Subject to any disclaimer, the term of this patent is extended or adjusted under 35 U.S.C. 154(b) by 0 days.

(21) Appl. No.: 14/590,387

(22) Filed: Jan. 6, 2015

(65) Prior Publication Data

US 2015/0198945 A1    Jul. 16, 2015

(30) Foreign Application Priority Data

Jan. 15, 2014 (JP) ................. 2014-005338

(51) Int. Cl.

| | |
|---|---|
| *G06F 19/00* | (2011.01) |
| *G05B 19/418* | (2006.01) |
| *B25J 9/16* | (2006.01) |
| *H04L 29/08* | (2006.01) |

(52) U.S. Cl.
CPC .......... *G05B 19/41855* (2013.01); *B25J 9/16* (2013.01); *B25J 9/1674* (2013.01); *H04L 67/025* (2013.01); *H04L 67/10* (2013.01); *G05B 2219/31334* (2013.01); *G05B 2219/31457* (2013.01); *G05B 2219/31467* (2013.01); *G05B 2219/34038* (2013.01); *G05B 2219/36159* (2013.01); *G05B 2219/40174* (2013.01); *Y02P 90/16* (2015.11); *Y02P 90/185* (2015.11); *Y10S 901/46* (2013.01)

(58) Field of Classification Search
USPC .................................. 700/245–264
See application file for complete search history.

(56) References Cited

U.S. PATENT DOCUMENTS

| | | | | |
|---|---|---|---|---|
| 8,924,042 B2* | 12/2014 | Kim | ..................... | G07C 5/0841 |
| | | | | 701/2 |
| 8,989,053 B1* | 3/2015 | Skaaksrud | ............ | H04W 12/06 |
| | | | | 370/255 |
| 2005/0204505 A1* | 9/2005 | Kashiwagi | ........... | G05D 1/0246 |
| | | | | 15/319 |

(Continued)

FOREIGN PATENT DOCUMENTS

| | | |
|---|---|---|
| JP | 2000-039910 | 2/2000 |
| JP | 2000039910 | 2/2000 |

(Continued)

*Primary Examiner* — Bhavesh V Amin (57) ABSTRACT

A robot remote monitoring system (6) which monitors at least one robot (10) at a distant location including at least one robot control device (11), a data server (20), and a mobile terminal (30), wherein a robot control device includes a memory part (14) which stores monitoring information which includes an operating state of the robot and alarm information and attribute information which is linked with the monitoring information and a transmitting part (15) which transmits the monitoring information and the attribute information to the data server together, the data server includes a transmitting part (21) which transmits the monitoring information and the attribute information to the mobile terminal together, and the mobile terminal includes a memory part (33) which stores the monitoring information and the attribute information and a display part (34) which uses the attribute information as the basis to display the monitoring information all together.

5 Claims, 5 Drawing Sheets

(56) References Cited

U.S. PATENT DOCUMENTS

| | | | |
|---|---|---|---|
| 2006/0095158 A1* | 5/2006 | Lee | G05D 1/0246 700/245 |
| 2006/0178777 A1 | 8/2006 | Park et al. | |
| 2007/0100500 A1* | 5/2007 | Abramson | A47L 5/22 700/245 |
| 2012/0046820 A1* | 2/2012 | Allard | G05D 1/0246 701/25 |
| 2012/0265370 A1* | 10/2012 | Kim | G07C 5/0841 701/2 |
| 2013/0212420 A1* | 8/2013 | Lawson | G05B 19/4185 713/400 |
| 2013/0290234 A1* | 10/2013 | Harris | G06N 5/022 706/46 |
| 2015/0198945 A1* | 7/2015 | Liang | H04L 67/025 700/245 |

FOREIGN PATENT DOCUMENTS

| | | |
|---|---|---|
| JP | 2001072489 | 3/2001 |
| JP | 2002082707 | 3/2002 |
| JP | 2002207513 | 7/2002 |
| JP | 2004206361 | 7/2004 |
| JP | 2006512692 | 4/2006 |
| JP | 2009-026184 | 5/2009 |
| JP | 2009026184 | 5/2009 |
| JP | 2009104554 | 5/2009 |
| JP | 2012529104 | 11/2012 |
| WO | 2007122902 | 11/2007 |
| WO | 2010141180 | 12/2010 |

* cited by examiner

REMOTE MONITORING SYSTEM FOR DISTANT LOCATION ROBOT

BACKGROUND OF THE INVENTION

1. Field of the Invention

The present invention relates to a robot remote monitoring system which monitors one or more robots which are located at distant locations.

2. Description of the Related Art

A remote monitoring and maintenance system that transmits detected information from monitored objects to a monitoring center and has the monitoring center process the information detected from the monitored objects and transmit the results to a mobile terminal has been utilized since the past. Such a remote monitoring and maintenance system has been rapidly spreading along with the increase in smartphones. In the field of industrial robots as well, monitoring systems which transmit monitoring information from robots to a monitoring center and display the statuses of the robots at the monitoring center side are being used.

Japanese Patent Publication No. 2009-26184A discloses to send fault information of a monitored object through a monitoring center to a mobile terminal and display the received information at the mobile terminal. Further, Japanese Patent Publication No. 2000-039910A discloses a method of transmitting sensor information and robot information in a teaching operation or working operation of a robot with sensors over at least one of the Internet and an intranet in real time.

However, Japanese Patent Publication No. 2009-26184A has the problem that there is no function of displaying the information of all of the monitored objects all together and that confirmation took time. Further, Japanese Patent Publication No. 2000-039910A had the problem that when monitoring a large number of robots, the communication time became longer or the mobile terminal easily became ran out of capacity.

The present invention was made in consideration of such a situation and has as its object the provision of a robot remote monitoring system which can easily monitor the operating states of a large number of robots located at a distant location and being monitored.

SUMMARY OF INVENTION

To achieve the above object, according to a first aspect, there is provided a robot remote monitoring system which monitors at least one robot at a distant location, comprising at least one robot control device which controls the at least one robot, a data server, and a mobile terminal, wherein each of the at least one robot control devices comprises a control device memory part which stores monitoring information which includes an operating state of the robot and alarm information and attribute information which is linked with the monitoring information and a control device transmitting part which transmits the monitoring information and the attribute information to the data server together, the data server comprises a data server transmitting part which transmits the monitoring information and the attribute information to the mobile terminal together, and the mobile terminal comprises a mobile terminal memory part which stores the monitoring information and the attribute information and a display part which uses the attribute information as the basis to display the monitoring information all together.

According to a second aspect, there is provided the first aspect wherein the at least one robot control device comprises a designating part which designates a transmission timing by which the control device transmitting part transmits the monitoring information to the data server, the control device memory part is designed to store the transmission timing which is designated by the designating part linked with the monitoring information, and the control device transmitting part transmits the monitoring information and the attribute information to the data server in accordance with the transmission timing.

According to a third aspect, there is provided the first or second aspect wherein the mobile terminal comprises a designating part which designates a time band for monitoring the robot control devices and an acquiring part acquires the monitoring information and the attribute information in the time band which is designated by the designating part.

According to a fourth aspect, there is provided any of the first to third aspects wherein the mobile terminal comprises a designating part which designates an update interval of the monitoring information and the attribute information and a processing part which uses a time which is required from transmission to display of the monitoring information and the attribute information from the data server and a number of pieces of the monitoring information as the basis to calculate an average processing time, the system designed to multiply the number of pieces of the monitoring information and the average processing time to calculate a required processing time and to update only monitoring information which includes a predetermined order or more of priority when the required processing time is longer than the update interval which is designated by the designating part.

According to a fifth aspect, there is provided any of the first to third aspects wherein the mobile terminal comprises a designating part which designates the attribute information to be deleted and a deleting part which deletes the monitoring information which is linked with the attribute information which is designated by the designating part.

These and other objects, features, and advantages of the present invention will become clearer from the detailed description of typical embodiments of the present invention which are shown in the attached drawings.

DETAILED DESCRIPTION

Below, embodiments of the present invention will be explained with reference to the attached drawings. In the following figures, similar members are assigned similar reference notations. To facilitate understanding, these figures are suitably changed in scale.

Figure 1:
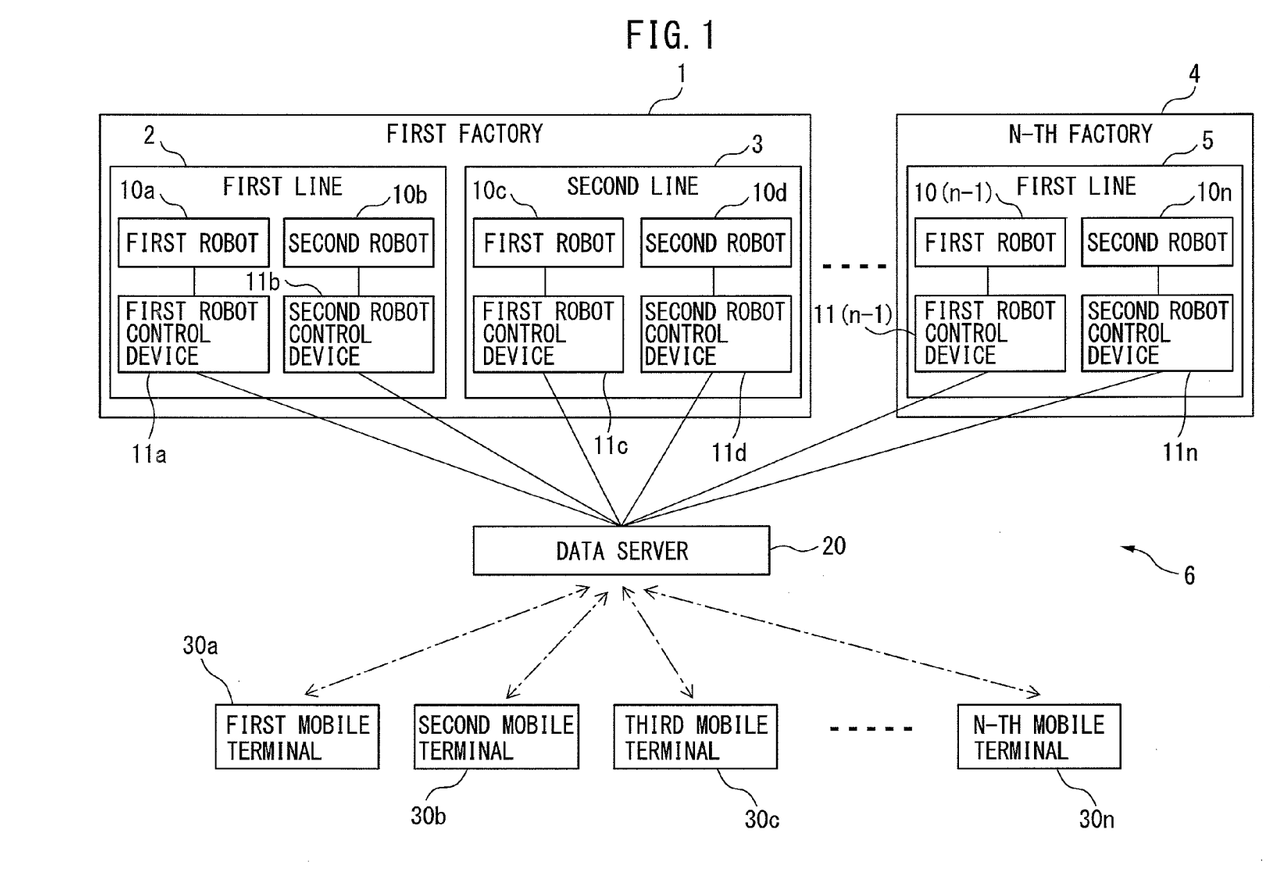
FIG. 1 is a view which shows an example of a robot remote monitoring system according to the present invention.

FIG. 1 is a view which shows one example of a robot remote monitoring system according to the present invention. As shown in FIG. 1, a first factory 1 includes a first line 2 and a second line 3. The first line 2 includes a first robot 10a and second robot 10b and robot control devices 11a and 11b which are respectively connected to these robots to control them. In the same way, the second line 3 includes a third robot 10c and fourth robot 10d and robot control devices 11c and 11d which are respectively connected to these robots to control them.

Furthermore, the N-th factory 4 includes a single N-th line 5. The N-th line 5 includes an (N−1)th robot 10(n−1) and N-th robot 10n and robot control devices 11(n−1) and 11n which are respectively connected to these robots to control them.

Note that for simplification, while not shown in the drawings, there may be at least one other factory in addition to the first factory 1 and the N-th factory 4. Further, at least one factory is deemed to include at least one line, and at least one line is deemed to include at least one robot.

As shown in FIG. 1, the robot control devices are connected to a data server 20. Further, the data server 20 can be accessed by the first mobile terminal 30a to the N-th mobile terminal 30n. These mobile terminals are for example smartphones.

The data server 20 and the robot control devices 11a to 11n are preferably connected by an intranet by cables. The data server 20 and the mobile terminals 30a to 30n are preferably connected by the Internet wirelessly. However, the data server 20 and the robot control devices 11a to 11n may also be connected by the Internet and the data server 20 and the mobile terminals 30a to 30n may also be connected by the intranet. Furthermore, such connections may be by cable or wireless.

As shown in FIG. 1, the robot remote system 6 of the present invention is defined as one which includes one or more robot control devices 11a to 11n which control one or more robots 10a to 10n, a data server 20, and one or more mobile terminals 30a to 30n. Further, as will be understood from FIG. 1, the robot control devices 11a to 11n may be arranged on different lines or may be arranged at different factories.

Figure 2:
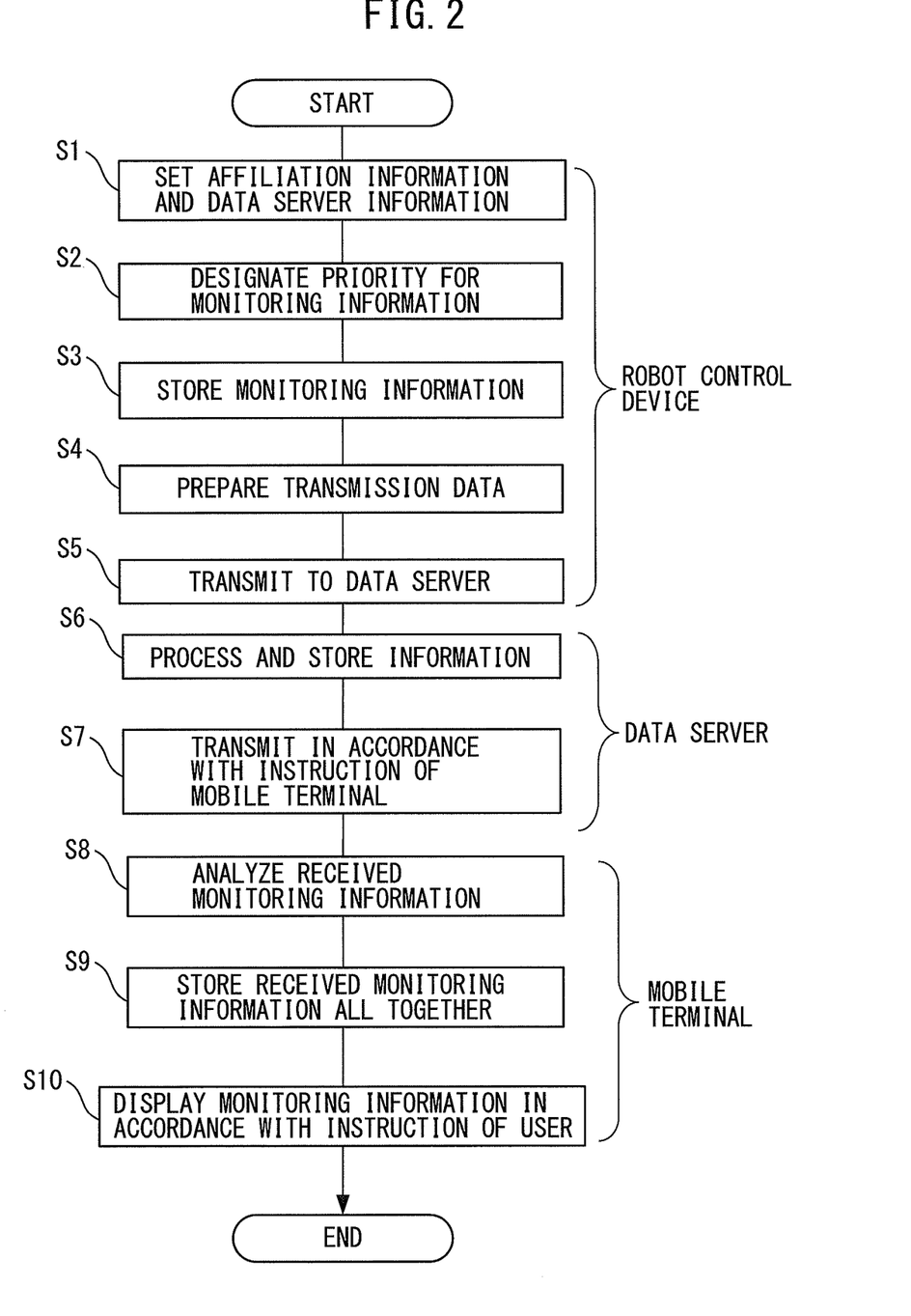
FIG. 2 is a flow chart which shows the operation of the robot remote monitoring system according to the present invention.

FIG. 2 is a flow chart which shows the operation of a robot remote monitoring system according to the present invention. Below, based on FIG. 2, the operation of a robot remote system of the present invention will be explained. The operations of step S1 to step S5 which are shown in FIG. 2 are performed by the plurality of robot control devices 11a to 11n. First, at step S1, affiliation information and data server information are set. Here, the "affiliation information" is part of the attribute information. The affiliation information includes the names of the plurality of robots 10a to 10n, the names of the factories 1 and 4 in which the robots 10a to 10n are arranged, and the names of the production lines 2, 3, and 5 in the factories 1 and 4. These names may also be numbers.

Figure 3:
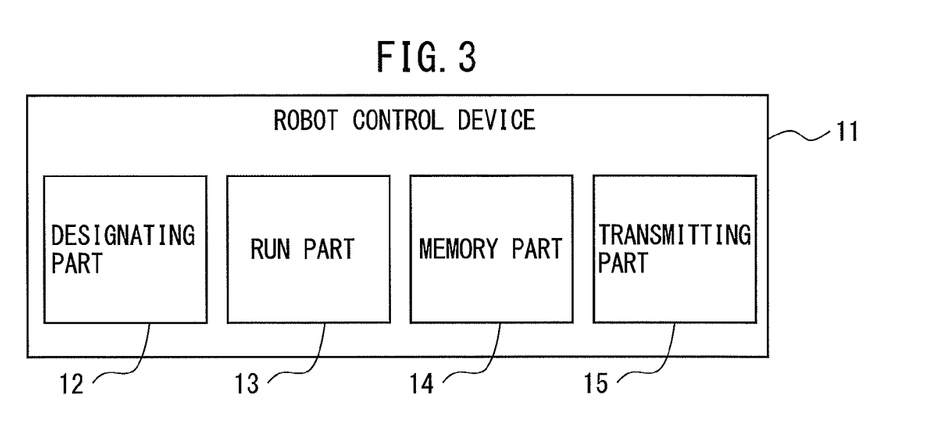
FIG. 3 is a block diagram of a robot control device.

Here, FIG. 3 is a block diagram of a robot control device. The robot control device 11 which is shown in FIG. 3 is configured in the same way in each of the robot control devices 11a to 11n. As shown in FIG. 3, the robot control device 11 includes a designating part 12 by which the operator designates various conditions, a run part 13 which runs an operating program of the corresponding robot 10, a memory part 14 which stores various types of data, and a transmitting part 15 which transmits information which is stored in the memory part 14 to the data server 20.

At step S1 which is shown in FIG. 2, the designating parts 12, for example, keyboards, mouses, etc., which are provided at the robot control devices 11a to 11n are used to designate their names or numbers. Note that the data server information is address information of the data server 20, so is automatically determined.

Then, at step S2, the monitoring information is set. Here, the monitoring information includes operating information regarding the robots 10a to 10n, that is, information which shows whether the robots 10a to 10n which are being monitored are operating or are stopped.

Furthermore, the monitoring information includes alarm information. Further, the alarm information includes alarm numbers and alarm contents accompanying the alarm numbers. The alarm contents include, for example, an alarm emitted when a robot has stopped, an alarm regarding the quality of the product which the robot works, an alarm which shows the operating information, a warning alarm, user alarm, etc. and may also include other alarms. The monitoring information is set by using the designating parts 12 which are provided at the robot control devices 11a to 11n.

Furthermore, at step S2, the monitoring information are assigned priority orders by using the designating parts 12. For example, in the following example, the alarm information of the monitoring information are assigned priority orders. However, the priority orders can be freely set by the operator and monitoring information other than the alarm information can also be assigned priority orders. The priority order is part of the attribute information.

Alarm indicating robot has stopped: Priority order (1)
Alarm affecting production quality: Priority order (2)
Alarm indicating operating information: Priority order (3)
Warning alarm: Priority order (4)
User alarm: Priority order (5)

Then, at step S3, the robot control devices 11a to 11n run operating programs by running parts 13 to make the corresponding robots 10a to 10n operate. Further, if an alarm is emitted relating to one or more of the above-mentioned alarm contents while the operating programs are being run, the memory parts 14 of the robot control devices 11a to 11n store the alarm number, alarm details, and error history of the alarm. Here, the error history is a type of time information which shows the history of the time at which the alarm was emitted. Furthermore, while the operating programs are being run, the memory parts 14 of the robot control devices 11a to 11n store operating information of the corresponding robots 10a to 10n for each predetermined control period.

Then, at step S4, attribute information is added to the monitoring information which is stored in the memory parts 14 of the robot control devices 11a to 11n, that is, the operating information and alarm information, to prepare transmission data. Here, the attribute information includes at least one of affiliation information, priority, and time information. Below, "information" is deemed to suitably include both monitoring information and attribute information.

Then, at step S5, the transmitting parts 15 of the robot control devices 11a to 11n transmit transmission data to the data server 20 which was set at step S1. The operations of step S6 to step S7 which are shown in FIG. 2 are performed by the data server 20.

Figure 4:
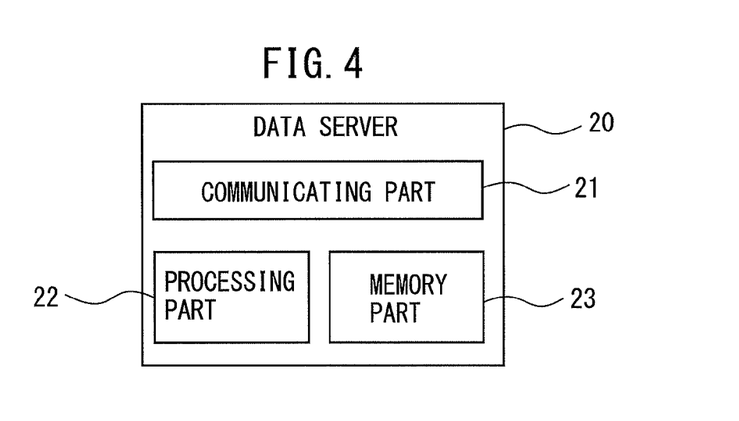
FIG. 4 is a block diagram of a data server.

FIG. 4 is a block diagram of a data server. The data server 20 which is shown in FIG. 4 includes a communication part 21 which can communicate with the robot control devices 11a to 11n and mobile terminals 30a to 30n, a processing part 22 which processes various types of data, and a memory part 23 which stores various types of data.

Referring again to FIG. 2, at step S6, the communication part 21 of the data server 20 supplies the transmission data which are transmitted from the robot control devices 11a to 11n to the processing part 22 of the data server 20. Further, the processing part 22 assigns a special ID to the information of the transmission data and supplies it to the memory part 23 of the data server 20. By assigning an ID, it becomes clear whether the information has been processed. The memory part 23 stores the information which has been assigned an ID.

Then, at step S7, the communication part 21 of the data server 20 receives an instruction of any of the mobile terminals 30a to 30n and supplies it to the processing part 22. Further, the processing part 22 prepares information in accordance with the instructions from the mobile terminals 30a to 30n and supplies it to the communication part 21. Further, the communication part 21 of the data server 20 transmits information to the mobile terminals. The operations of the following step S8 to step S10 are performed at the mobile terminals 30a to 30n.

Figure 5:
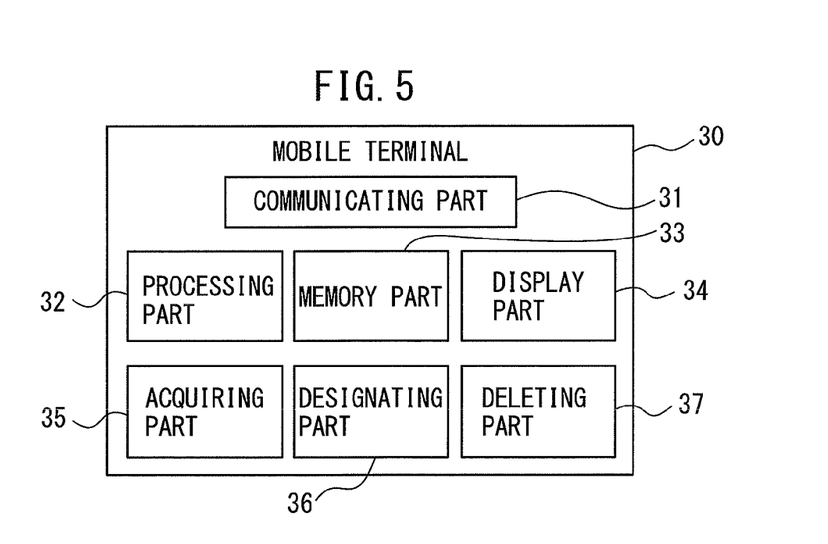
FIG. 5 is a block diagram of a mobile terminal.

FIG. 5 is a block diagram of a mobile terminal. The mobile terminal 30 which is shown in FIG. 5 is configured the same in the mobile terminals 30a to 30n. As shown in FIG. 5, the mobile terminal 30 includes a communication part 31 which can communicate with a data server 20, a processing part 32 which processes various types of data, a memory part 33 which stores various types of data, and a display part 34 which displays the requested information. Furthermore, the mobile terminal 30 includes an acquiring part 35 which acquires various types of data, a designating part 36 which enables an operator to designate various conditions, and a deleting part 37 which deletes monitoring information which is linked with the attribute information which was designated by the designating part 36.

Referring again to FIG. 2, at step S8, the communication part 31 of the mobile terminal 30 supplies information which was received from the data server 20 to the processing part 32 of the mobile terminal 30. Further, the processing part 32 of the mobile terminal 30 runs a search through the priority, affiliation information, and time information of the received information.

Then, at step S9, the memory part 33 of the mobile terminal 30 stores the information which was processed at processing part 32 for each factory, for each production line, and for each robot all together.

Then, at step S10, the mobile terminal 30 displays information at the display part 34 of the mobile terminal 30. Specifically, the acquiring part 35 acquires information from the memory part 33 and displays it at the display part 34. Further, it displays a warning regarding monitoring information of a predetermined order or more of priority to notify it to the operator. The predetermined order is made one which is set in advance by the operator. Furthermore, when there are a plurality of priorities having predetermined orders, the monitoring information is displayed in accordance with the priority order.

Furthermore, the mobile terminal 30 may also color code the monitoring information in accordance with its priority order for display at the display part 34. For example, the monitoring information can be displayed by the red color, yellow color, green color, and black color starting from the highest priority order. Furthermore, the display part 34 of the mobile terminal 30 can display the related information all together for each factory, for each production line, for each robot, and based on the type of the monitoring information.

Due to this, in the present invention, the mobile terminals 30a to 30n can be used at any time and at any place to monitor the operating states of the robots 10a to 10n at distant locations. Furthermore, the attribute information of the plurality of robots 10a to 10n can be used as the basis to display monitoring information all together. For example, the monitoring information of only a specific factory, the monitoring information of only a specific line, or the monitoring information of only a specific robot can be displayed. For this reason, in the present invention, it is also possible to reduce the load on the monitoring worker. In particular, in recent years, unmanned production lines have been increasing, so the present invention is particularly advantageous for monitoring such a production line.

In this regard, the designating parts 12 of the robot control devices 11a to 11n can be used to designate the transmission timing for the transmitting parts 15 of the robot control devices 11a to 11n to transmit monitoring information to the data server 20. The transmission timing is one type of time information and can be designated for each of the monitoring information.

For example, when the monitoring information is specific alarm information, it is possible to designate immediate transmission of the alarm information right after an alarm relating to that alarm information is generated. Alternatively, it is also possible to designate a time interval for transmission by a designating part 12 and transmit the information every time interval. Further, the designating part 12 may also be used to directly designate the transmission time.

When such a transmission timing is designated, the memory parts 14 of the robot control devices 11a to 11 store the transmission timing linked with the monitoring information. Further, the monitoring information is transmitted to the data server 20 in accordance with the designated transmission timing. In the present invention, the transmission timing can be designated, and the operator can obtain attribute information and monitoring information according to the operator's own convenience.

Figure 6:
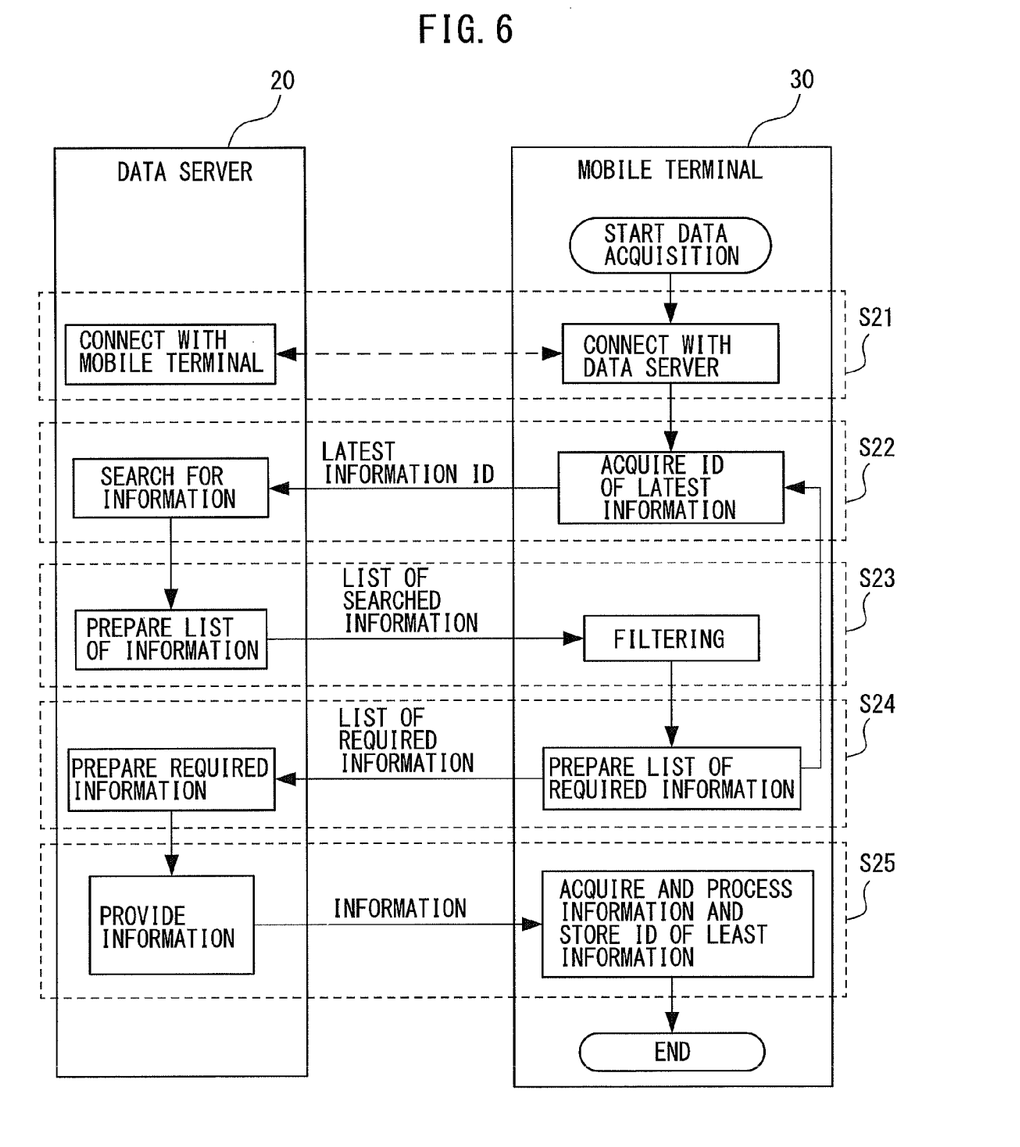
FIG. 6 is a view which shows the flow of communications between a data server and one mobile terminal.

In this regard, FIG. 6 is a view which shows the flow of communication between a data server and one mobile terminal. As shown in FIG. 6 at step S21, the communication part 31 of the mobile terminal 30 periodically connects to the data server 20. Further, at step S22, the ID of the latest information which was processed by the mobile terminal 30 is supplied through the communication part 31 of the mobile terminal 30 to the data server 20.

Then, the communication part 21 of the data server 20 receives the ID of the latest information and supplies it to the processing part 22 of the data server 20. The processing part 22 of the data server 20 searches inside the memory part 23 of the data server 20 to determine if there is information newer than the ID of the latest information.

Further, at step S23, when there is information newer than the ID of the latest information, a list of information which includes information newer than the ID of the latest information is prepared. Then, that list is supplied through the communication part 21 of the data server 20 to the mobile terminal 30. Then, the communication part 31 of the mobile terminal 30 receives the list of information from the data server 20 and supplies it to the processing part 32 of the mobile terminal 30. The processing part 32 of the mobile terminal 30 uses the list of information as the basis to perform the later mentioned filtering processing in accordance with certain criteria.

The thus prepared list of information is supplied at step S24 through the communication part 31 of the mobile terminal 30 to the data server 20. Then, the communication part 21 of the data server 20 receives the list of required information and supplies it to the processing part 22 of the data server 20. The processing part 22 of the data server 20 collects information in accordance with the list of required information. At step S25, this information is supplied through the communication part 21 of the data server 20 to the mobile terminal 30. After that, the mobile terminal 30 receives and processes the information and stores the ID of the final information in the memory part 33 of the mobile terminal 30. By such a series of processing, it will be understood that the mobile terminal 30 can always store the ID of the latest information.

In this regard, the mobile terminal 30 includes a designating part 36 which designates the time band to be monitored. The time band to be monitored may, for example, but only the daytime time band or may be only the nighttime time band. When the designating part 36 is not used to designate the time band, the time band to be monitored may be designated when acquiring the ID of the latest information (step S22).

When the designating part 36 is used to designate the time band to be monitored, instead of the ID of the latest information, the designated time band is transmitted to the data server 20. The data server 20 prepares a list of information which is stored at a designated time band. Such a list of information is acquired by the acquiring part 35 of the mobile terminal 30. Due to this, it is possible to acquire the monitoring information of the designated time band. In other words, it is possible to designate the desired time band and confirm the monitoring information in that time band. Therefore, the load of confirmation on the monitoring worker can be reduced. Furthermore, the situation where the mobile terminal 30 runs out of capacity or the communication time becomes longer can be avoided.

Figure 7:
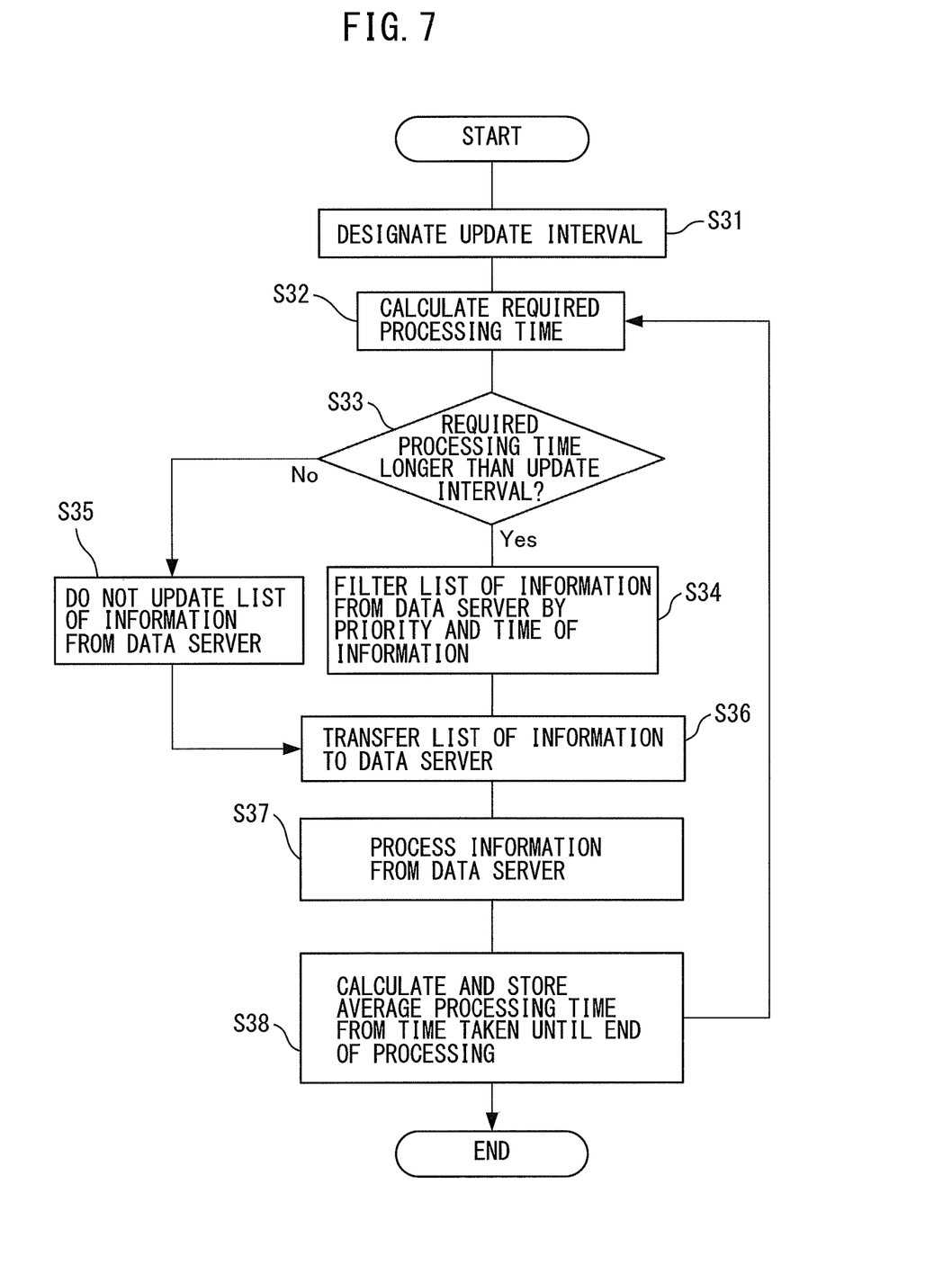
FIG. 7 is a flow chart which shows the processing relating to a certain criteria in the filtering which is shown in FIG. 6.

In this regard, as shown in FIG. 6 at step S23, the processing part 32 of the mobile terminal 30 performs filtering processing in accordance with predetermined criteria based on the list of information. Here, FIG. 7 is a flow chart which shows the processing relating to the predetermined criteria in the filtering which is shown in FIG. 6. In FIG. 7 at step S31, the designating part 36 of the mobile terminal 30 is used to designate the update interval of information at the mobile terminal 30. Further, at step S32, the number of pieces of information in the list of information which is received from the data server 20 and the average processing time which is stored in advance in the memory part 33 of the mobile terminal 30 are used as the basis to calculate the required average processing time from the following formula (1).

(Required processing time)=(Average processing time)×(number of pieces of information)   formula (1)

Here, the "average processing time" is expressed by the following formula (2):

(Average processing time)=(Time from acquisition of data from data server 20 to display at display part 34)/(number of pieces of information)   formula (2)

Then, at step S33, it is judged if the required processing time is longer than the designated update interval. When the required processing time is longer than the update interval, the routine proceeds to step S34, while when not longer, the routine proceeds to step S35.

At step S34, to process the high priority information with priority, the list of information is filtered to update it. Alternatively, it is also possible to update only the information having a predetermined order or more of priority. Due to this, it will be understood that the update processing becomes simpler and the processing time is shortened. In this case, only information which has a predetermined order or more of priority is displayed at the display part 34 of the mobile terminal 30. As opposed to this, at step S35, the list of information from the data server 20 is not updated.

Further, at step S36, the list of information is supplied from the mobile terminal 30 to the data server 20. Then, at step S37, the mobile terminal 30 receives and processes information from the data server 20 as explained above. Further, at step S38, the mobile terminal 30 receives information from the data server 20 and stores the time until displaying it at the display part 34 in the memory part 33. Further, it uses the above-mentioned formula (2) as the basis to calculate and store the average processing time. The stored average processing time is used at the time of the next update.

In this regard, the designating part 36 of a mobile terminal 30 can be used to designate several pieces of attribute information for deletion. In this case, the deleting part 37 of the mobile terminal 30 deletes the monitoring information relating to the attribute information which was designated by the designating part 36. As a result, it is possible to obtain just the monitoring information relating to attribute information which the operator has requested.

For example, the designating part 36 of the mobile terminal 30 can be used to delete all of the information relating to factories other than a specific factory, for example, the first factory 1, and enable the information of only the first factory 1 to be viewed. Therefore, it will be understood that the operation for viewing the requested attribute information becomes more streamlined and more efficient and the request of the operator can be flexibly handled. Furthermore, even in a robot remote system 6 which includes a large number of robots, the situation of the memory part 33 of a mobile terminal 30 running out of capacity or the communication time becoming longer can be avoided.

Advantageous Effects of Invention

In the first aspect, the operating state of one or more robots at distant locations can be easily monitored. Further, the attribute information and monitoring information of a plurality of robots can be displayed together, so the load on the monitoring worker can be reduced. This is particularly advantageous for monitoring an unmanned production line.

In the second aspect, the transmission timing can be designated, so the operator can obtain attribute information and monitoring information in accordance with the operator's own convenience.

In the third aspect, the time band for monitoring the robot control devices can be designated, so the attribute information and monitoring information can be obtained only in the time band which the operator demands. For this reason, situations where the capacity of the mobile terminal becomes insufficient or the communication time becomes long can be avoided.

In the fourth aspect, only monitoring information which includes a predetermined order or more of priority is updated when a product of the number of pieces of monitoring information and average processing time is longer than the update interval. Therefore, the update processing becomes simple and the processing time can be shortened.

In the fifth aspect, the designating part can be used to delete part of the attribute information from the mobile terminal, so just monitoring information relating to the attribute information which the operator requests can be obtained. Further, even in a robot remote monitoring system which includes a large number of robots, situations where the capacity of the mobile terminal becomes insufficient or the communication time becomes long can be avoided.

Typical embodiments were used to explain the present invention, but a person skilled in the art would understand that the above-mentioned changes and various other changes, deletions, and additions may be made without departing from the scope of the present invention.

What is claimed is:

1. A robot remote monitoring system which monitors at least one robot at a distant location, comprising
    at least one robot control device which controls said at least one robot,
    a data server, and
    a plurality of mobile terminals, wherein
    each of said at least one robot control devices comprises:
        a control device memory part which stores monitoring information, which includes an operating state of said robot and alarm information, and attribute information which is linked with said monitoring information and
        a control device transmitting part which transmits said monitoring information and said attribute information to said data server together,
    said data server comprises a data server transmitting part which transmits said monitoring information and said attribute information to said plurality of mobile terminals together, and
    said plurality of mobile terminals each comprise:
        a mobile terminal memory part which stores said monitoring information and said attribute information and
        a display part which uses said attribute information as the basis to display said monitoring information all together;
        a designating part which designates a respective time band for monitoring said robot control devices; and
        an acquiring part acquires said monitoring information and said attribute information in the time band which is designated by said designating part.

2. The robot remote monitoring system according to claim 1 wherein
    said at least one robot control device comprises a designating part which designates a transmission timing by which said control device transmitting part transmits said monitoring information to said data server,
    said control device memory part is designed to store said transmission timing which is designated by said designating part linked with said monitoring information, and
    said control device transmitting part transmits said monitoring information and said attribute information to said data server in accordance with said transmission timing.

3. A robot remote monitoring system which monitors at least one robot at a distant location, comprising
    at least one robot control device which controls said at least one robot,
    a data server, and
    a mobile terminal, wherein
    each of said at least one robot control devices comprises:
        a control device memory part which stores monitoring information, which includes an operating state of said robot and alarm information, and attribute information which is linked with said monitoring information and
        a control device transmitting part which transmits said monitoring information and said attribute information to said data server together,
    said data server comprises a data server transmitting part which transmits said monitoring information and said attribute information to said mobile terminal together, and
    said mobile terminal comprises
        a mobile terminal memory part which stores said monitoring information and said attribute information and
        a display part which uses said attribute information as the basis to display said monitoring information all together;
        a designating part which designates a time band for monitoring said robot control devices and
    an acquiring part acquires said monitoring information and said attribute information in the time band which is designated by said designating part, wherein said mobile terminal further comprises
        a designating part which designates an update interval of said monitoring information and said attribute information and,
        a processing part which uses a time which is required from transmission to display of said monitoring information and said attribute information from said data server and a number of pieces of said monitoring information as the basis to calculate an average processing time,
    the system designed to multiply the number of pieces of said monitoring information and said average processing time to calculate a required processing time and to update only monitoring information which includes a predetermined order or more of priority when said required processing time is longer than the update interval which is designated by said designating part.

4. The robot remote monitoring system according to claim 1 wherein said mobile terminal comprises
    a designating part which designates said attribute information to be deleted and
    a deleting part which deletes said monitoring information which is linked with said attribute information which is designated by said designating part.

5. The robot remote monitoring system according to claim 1, wherein the time band is designated to occur while the robot is in operation.

* * * * *